Feb. 12, 1929.
J. W. WARNER
1,701,521
SEPARABLE END THRUST BUSHING
Filed March 4, 1927
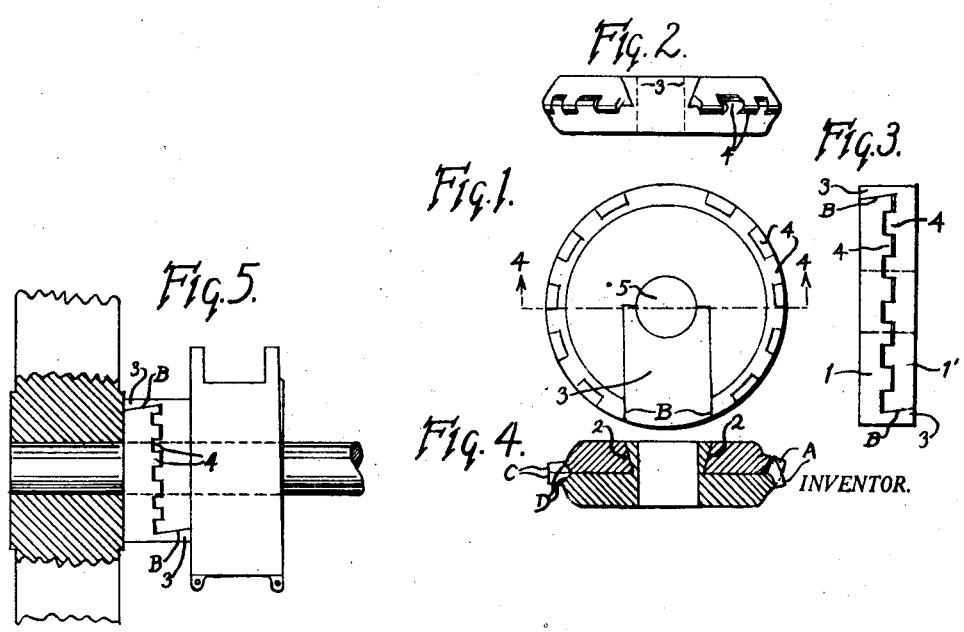
John W. Warner.
BY U.G.Charles
ATTORNEY.

Patented Feb. 12, 1929.

1,701,521

UNITED STATES PATENT OFFICE.

JOHN W. WARNER, OF TOPEKA, KANSAS.

SEPARABLE END-THRUST BUSHING.

Application filed March 4, 1927. Serial No. 172,791.

My invention relates to a separable end thrust bushing.

The object of my invention is to provide a bushing that is separable for placing on a journal or line shaft when the installation of wheels, pulleys, boxing or the like renders it impracticable to enter the bushing at the end of the shaft or journal and slide it to proper place of engagement.

A further object of my invention is to provide a locking means for the members that will prevent spreading of the outer end thereof which is caused by a radial slot.

A still further object of my invention is to provide an end thrust bushing that a separable roller or ball race may be imbedded in the sides thereof to function as an end thrust ball roller bearing.

These and other objects will hereinafter be more fully explained.

Referring to the drawings:

Fig. 1 is a side view of the bushing, the parts being assembled.

Figs. 2 and 3 are transverse views of Fig. 1.

Fig. 4 is a cross sectional view taken on line 4—4 in Fig. 1.

Fig. 5 is a view showing an application of the bushing between a wheel and a bearing, parts removed for convenience of illustration.

The separable end thrust bushing herein disclosed consists of two disc like members 1 and 1'. The said members have a radial slot, the edges of which are beveled as shown at 2 in Fig. 4. On the opposite side of said slot is a raised portion 3 integral with the disc, the parallel edges of said portion being bevelled to coincide with the first said bevels thereby forming a dove-tail for the engagement of the adjacent sides of members 1 and 1'.

Peripherally positioned on the disc members are a plurality of radially extending lugs 4 alternately positioned and integral therewith. The said lugs are spaced apart approximately equal to their width so that when disc members 1 and 1' are moved to registry the lugs may be bent over engaging snugly in the adjacent space as shown at A in Fig. 1, and when so clinched will prevent sliding movement, and also bind firmly the outer points as at B, preventing said points from spreading.

Fig. 4 shows the lugs as at C before being clinched and when clinched as shown at A in said view the side of the lugs will bear snugly on a bevelled plane between the lugs shown at D, and having a solid bearing thereon makes it possible to peen the lugs for tight engagement with each other. Should it become necessary to separate the members of the bushing it is possible by the use of a punch to bend the lugs back to their normal position at which time the sliding movement of the dove-tail member will permit separation from each other and from a shaft inclosed in the aperture 5 and when placed on the shaft one of the members may be placed snugly thereon by entering the member through the radial slots and likewise the other member, then by clinching the lugs the bushing is attached to the shaft firmly or revolvably as the case may require.

Such modifications may be employed as lie within the scope of the appended claim.

Having thus described my invention, what I claim as new and desire to secure by Letters Patent is:—

A separable end thrust bushing comprising two similar disc-like members, the members each having a groove and a projection from one side, the groove of each member interlockingly engaging the projection of the other member, the peripheral walls of the grooves being beveled and the peripheral walls of the projection being undercut to coincide with the bevels, a plurality of peripherally positioned radially extending bendable lugs on each member located between the adjacent sides of the projection and the groove of such member, the lugs of each member being spaced apart to receive the lugs of the other member in interdigitated engagement to prevent said members from sliding in the same plane on each other, the engagement of the grooves and projections to prevent axial separation of the members.

In testimony whereof I affix my signature.

JOHN W. WARNER.